(12) United States Patent
Wenzler et al.

(10) Patent No.: US 7,263,976 B2
(45) Date of Patent: Sep. 4, 2007

(54) METHOD FOR CONTROLLING AN INTERNAL COMBUSTION ENGINE

(75) Inventors: Thomas Wenzler, Hockenheim (DE); Alexandra Woerz, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 344 days.

(21) Appl. No.: 11/090,338

(22) Filed: Mar. 24, 2005

(65) Prior Publication Data

US 2005/0241618 A1 Nov. 3, 2005

(30) Foreign Application Priority Data

Mar. 24, 2004 (DE) .................. 10 2004 014 369

(51) Int. Cl.
*F02D 43/00* (2006.01)
*F02P 5/15* (2006.01)
(52) U.S. Cl. .................. 123/478; 123/609; 123/406.19
(58) Field of Classification Search ................ 123/478, 123/609, 305, 406.18, 406.19; 73/116; 701/104, 701/105
See application file for complete search history.

(56) References Cited

U.S. PATENT DOCUMENTS

| 4,387,429 | A | * | 6/1983 | Yamauchi et al. | .......... 701/105 |
| 4,819,171 | A | * | 4/1989 | Morita | ........................ 701/111 |
| 4,941,446 | A | | 7/1990 | Denz et al. | ............. 123/406.18 |
| 6,012,427 | A | * | 1/2000 | Hoy et al. | ................ 123/406.5 |
| 6,334,428 | B1 | * | 1/2002 | Nagatani et al. | ............. 123/305 |

* cited by examiner

*Primary Examiner*—Willis R. Wolfe
*Assistant Examiner*—Johnny H. Hoang
(74) *Attorney, Agent, or Firm*—Kenyon & Kenyon LLP

(57) ABSTRACT

A method is proposed for controlling an internal combustion engine having a crankshaft, in which from the angular pulses of a sensor a pulse time is formed that is a measure for the rotation of the crankshaft of the internal combustion engine per time unit. At a predetermined target angle of the crankshaft, an ignition of a spark plug and an injection of fuel are to take place. A charging of an ignition coil before the ignition and the injection each require a predetermined time duration. The charging of the ignition coil and the injection are each started before the target angle at a start time dependent on the crankshaft, the start times being calculated by taking into account the time duration of the charging and of the portion of the injection before the target angle, and the pulse time, and the pulse counter. The same pulse time is used for the calculation of the start times of the charging of the ignition coil and of the injection.

8 Claims, 1 Drawing Sheet

METHOD FOR CONTROLLING AN INTERNAL COMBUSTION ENGINE

FIELD OF THE INVENTION

The present invention is based on a method for controlling an internal combustion engine.

BACKGROUND INFORMATION

Internal combustion engines are already known in which the rotation of the crankshaft is indicated by angular pulses. From the time interval of these angular pulses and from the time required for an injection or for the charging of an ignition coil, at each of these angular pulses it is checked whether, taking into account the rotational speed of the internal combustion engine, the time still remaining until the ignition point is sufficient for the charging of the ignition coil or for the injection. Correspondingly, the charging of the ignition coil or the injection is then begun with a temporal relation to this angular pulse. On the basis of the dynamic of the rotational speed of the crankshaft and the time interval, changing therewith, of the angular pulses, different parameters are used for these calculations if the calculated time of the injection and the calculated time of the charging of the ignition coil do not accidentally coincide. The two processes ignition and injection therefore have a poor temporal coupling.

SUMMARY OF THE INVENTION

In contrast, the method according to the present invention achieves a significantly improved temporal coupling of the process of ignition and the process of injection. This is advantageous in particular in gasoline engines with direct injection, in which a jet-guided combustion method is used.

The pulse time used can be determined particularly easily through the immediately preceding angular pulses. Alternatively, an averaged pulse time can also be used, which is advantageous in particular at high rotational speeds. Depending on which of the two processes injection and ignition begins first, corresponding time counters are loaded with a time offset between the two processes, or time counters for both processes are loaded that differ by a time offset between the processes. In this way, a simple measure ensures a rigid temporal coupling between the two processes.

The corresponding times for the individual processes are likewise monitored in particularly simple fashion using time counters. At high rotational speeds, it can occur that the charging of the ignition coil is begun before the parameters for the injection are known. Through the use of a uniform pulse time, here as well the temporal coupling of the two processes can be improved. In this case, the time counter for the injection process can be started at different angular pulses than the time counter for the ignition process.

DETAILED DESCRIPTION

Figure 1:
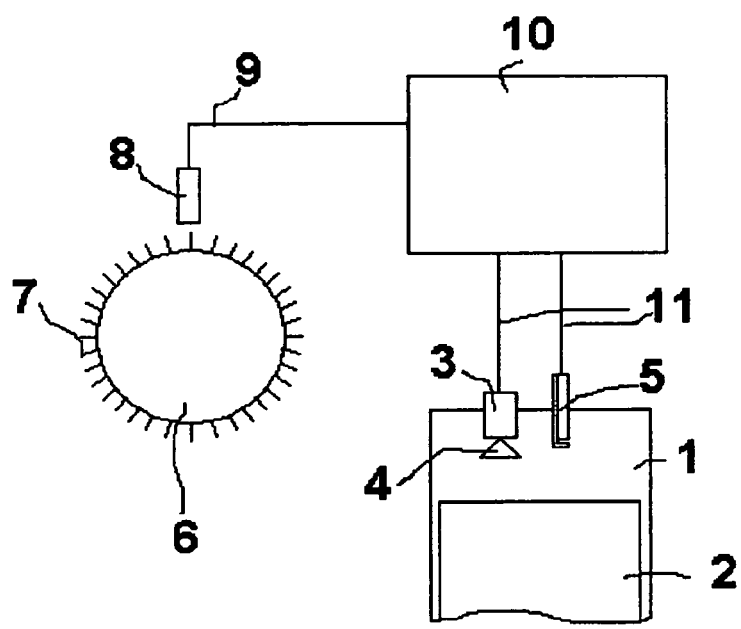
FIG. 1 schematically shows an internal combustion engine.

FIG. 1 shows an internal combustion engine in highly schematized fashion to the extent required for the understanding of the following invention. FIG. 1 shows a cylinder 1 having a piston 2 situated therein. Between cylinder 1 and piston 2, a combustion chamber is created into which air is introduced through valves (not shown). Using an injection valve 3, a jet of fuel 4 can be injected into the combustion chamber, so that in combination with the air situated therein a combustible mixture of fuel and air is formed. This mixture is then ignited by an ignition spark at spark plug 5. The combustion causes an increase in pressure that is converted into kinetic energy by a movement of piston 2. The design shown schematically here corresponds essentially to that of a known gasoline engine with direct fuel injection.

Piston 2 is connected by a connecting rod (not shown) with a crankshaft that converts the back-and-forth movement of the piston into a rotational motion. A trigger wheel 6 that has markings 7 is connected with the crankshaft. Here, "connected with" is to be understood in such a way that other shafts standing in a rigid relation to the crankshaft, such as for example the camshaft, can also be meant. When markings 7, which can for example be formed as teeth of a trigger wheel 6 formed as a toothed wheel, move past a sensor 8, in sensor 8 a signal pulse is produced that is supplied to a control device 10 via a line 9. In this way, control device 10 obtains an item of information concerning the rotation of the crankshaft; that is, an item of information concerning how piston 2 moves in cylinder 1. Here, it is for example essential to obtain precise knowledge of the upper dead point, that is, the point of reversal of the movements of piston 2, and the information as to whether this is the upper dead point of the charge changing process or of the ignition, because the triggering of the ignition in the combustion chamber usefully takes place close to this time. On the basis of this information and the desired operating states of the internal combustion engine, control device 10 calculates control signals for injection valve 3 or spark plug 5, which are supplied to these components via control lines 11. This procedure and all these components correspond to what is known to those skilled in the art as a gasoline engine with direct injection.

Figure 2:
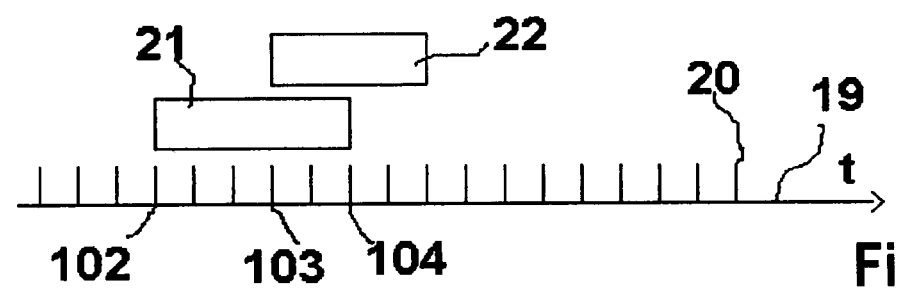
FIG. 2 shows a first time characteristic for the injection and the ignition.

In FIG. 2, a timeline 19 and corresponding needle-shaped signal pulses 20 of sensor 8 are shown. Given a trigger wheel fashioned as a toothed wheel, these pulses are fashioned as corresponding rectangular pulses. For example, the leading edge of each rectangular pulse is evaluated. In addition, a period of time 21 for the charging of an ignition coil and an additional period of time 22 for an injection are shown.

In the present example, the energy for the ignition sparks is provided by charging an ignition coil. Here, a flow of current is conducted through an ignition coil, resulting in the formation of a magnetic field in the ignition coil. When the flow of current through the primary side of the ignition coil is interrupted, the stored magnetic energy can flow off only to the secondary side of the ignition coil, thus producing a high-voltage pulse at the secondary side. In FIG. 2, the charging of the ignition coil is terminated at time 104; i.e., at this time the ignition is triggered. This time 104 is supposed to correspond to a predetermined fixed angular position of the crankshaft of the internal combustion engine. Here, a problem for the calculation of the point in time at which the ignition (or, correspondingly, the injection) is triggered is that both the charge duration for the charging of the ignition coil, i.e., the time duration 21, and also the time duration for the injection 22 are fixedly predetermined time durations. In order to achieve a defined temporal relation between ignition time 104 and the injection, at the beginning of the time duration of the charging of the ignition an item of information must therefore be present indicating the angular position reached by the crankshaft at the end of the time duration of the charging, and at the beginning of the time duration of the injection an item of information must be present indicating whether a predetermined time within the injection time has elapsed between the start time of the injection and the angular position at the end of the time duration of the charging of the ignition. However, at least at lower rotational speeds this is not possible, due to the large dynamic of the rotational speed.

The calculation of starting point 102 takes place using the pulse time, i.e., the time interval between two angular markings 7. The angular information of the target angle of the combustion is converted into a time by means of the pulse time. The charge time of the ignition coil is subtracted from the resulting ignition time point, thus yielding the start time 102 for the charging of the ignition coil. When the corresponding start time is reached, the charging of the ignition coil begins. The calculation of the start time is initiated by the angular pulse. With the calculation of the start time, there comes a changeover from an observation of the angle to a pure time measurement. This is required because the charge time for the ignition coil must not be undershot, as this can result in misfirings. If, after starting angle 102, there is a strong change in the rotational speed of the internal combustion engine, and the spacings between the angular pulses thus change, the ignition at time 104 no longer takes place at the desired ignition angle. However, this error must be accepted, because a shifting of the ignition time point is significantly less serious than is a skipping of the ignition due to too little energy for the ignition sparks.

The calculation for start time 103, at which the injection is started, takes place in a similar manner. On the basis of the desired injection quantity and the pressure in the injection system, the time duration required for the injection is determined. In addition, the injection should take place at the determined target angle of the crankshaft plus a determined time offset. On the basis of the required injection time, the target angle, the time offset, and the pulse time, a start time is thus calculated at which the injection is to take place. However, because start times 102 and 103 are different, rotational speed dynamic changes can result in displacements between the ignition and the injection. This is caused on the one hand by the fact that the pulse times, i.e., the intervals between the angular pulses, change, so that different pulse times are used for the calculations. In addition, the start time is of course also displaced due to the changing interval between the individual angular pulses. Another source of error is the angular tolerances of the crankshaft trigger wheel, which are reflected in the pulse times. If, for example, the calculation of the start time of the ignition is carried out using a tolerance-affected pulse time, and the calculation of the start time of the injection takes place using a pulse time whose tolerance has a sign that is the inverse of that with which the start time of the ignition was calculated, then there results a large deviation of the predetermined time offset between the target angle and the injection.

According to the present invention, two measures are therefore proposed:

In the first measure, for the calculation of start time 103, which is later here, the same pulse times are used as were also used for the start time calculation for first start time 102. The determination of the pulse time takes place in a range from start time 102. This means that for the calculation of the process that begins later (here injection), the same parameters are used as for the calculation of the process that begins earlier (here ignition). This also holds conversely, when first the injection is carried out and subsequently the ignition is carried out. In addition, from the time at which the earlier process was started (here, the start time for the ignition) a changeover to a time calculation also takes place for the beginning of the later process (here injection). That is, for the start time calculation in a defined range before start angle 102, it is not only determined that now the charging of the ignition coil is begun; rather, at the same time a time duration is calculated that indicates the time offset between the beginning of the charging of the ignition coil and the beginning of the injection. The time offset is calculated from the charge time of ignition coil 21 minus the portion of the injection time 22 until ignition angle 104 has been reached. The same pulse time is used in the calculation of the start time of ignition 102 and the calculation of the time offset. With the start time calculation, a first time counter is activated that triggers start event 102. At start time 102, time duration 21 is then measured using the same time counter, and after this time duration has elapsed, at time 104, the ignition spark is triggered. In addition, with the start time calculation an additional time counter is activated that, on the basis of the last angular pulse before the start time calculation, indicates the sum of the intervals from the last angular pulse before the start time calculation and 102 and the interval between start time 102 and 103, and at the expiration thereof the injection is begun. The time duration of the injection can then be correspondingly monitored by an additional time counter.

Various methods can be used for the calculation of the pulse time. One method can be to use the respective last pulse time before the start of the first process, here the beginning of the charging of the ignition coil. However, in addition it is also possible to use a plurality of measured pulse times before start time 102. These can be used in the form of an averaged pulse time or else in the form of an interpolated pulse time. For the averaged pulse time, a plurality of successive pulse times are simply averaged. This procedure is useful in particular for compensating manufacturing tolerances between the individual markings 7 on trigger wheel 6. Using an interpolation, a pulse time can be formed that takes into account the previous dynamic trend; i.e., a pulse time is used that corresponds approximately to the pulse time that is expected to be present at the desired target angle for the ignition. However, such a calculating method is very expensive. However, according to the present invention it is essential that the same pulse time be used for both processes.

Figure 3:
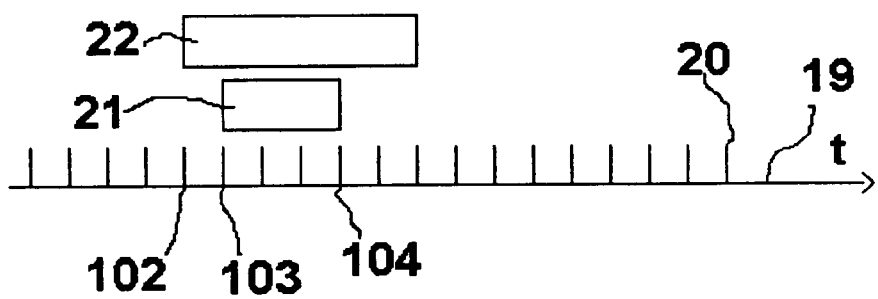
FIG. 3 shows a second time characteristic for the injection and the ignition.

FIG. 3 shows the situation in which the beginning of the injection comes before the beginning of the charging of the ignition coil. Again, a timeline 19 is shown, and the angular pulses 20 for a static operating state are correspondingly plotted. For the start time calculation at an angular pulse that is situated within a defined angular range before start time 102, ignition angle 104 is converted to a time point from which the portion of the injection time until the ignition angle is reached (spacing between 102 and 104) is subtracted. Start time 102 calculated in this way is the start time of the injection. Here, the behavior is such that with the start time calculation, a first counter is activated that triggers start event 102, and at start time 102 a time counter is set for the time duration 22 of the injection. In addition, with the start time calculation a counter is set that, on the basis of the last angular pulse before the start time calculation, contains the sum of the spacing between the last angular pulse before the start time calculation and 102 and the time offset between start time 102 and start time 103, at which the second process is started (charging of the ignition coil). With the expiration of this counter, at start time 103 the start of the second process, i.e., the beginning of the charging of the ignition coil, then takes place. At time 104, the ignition then takes place by terminating the charging process of the ignition coil.

The particular advantage of the procedure shown here of setting the parameters for the calculation of the second process already at the start of the first process, or determining the start of the first process from the parameters of the second process, is particularly clear in gasoline motors with direct injection, in which what is known as a jet-guided combustion method is used. In this jet-guided combustion method, injection jet 4 of injection valve 3 is ignited during the injection, or chronologically near the end of the injection, by ignition 5. However, an ignition of the mixture takes place only if the injection and the ignition are precisely synchronized with one another. If the injection takes place too late relative to the ignition spark, the injected fuel, in the form of a fine mist or gasoline vapor, has not yet reached the spark plug, and ignition does not take place. The same holds if the injection takes place too early, because then the corresponding fuel mist or vapor has already passed the spark plug. In this combustion method, it is therefore especially advantageous to temporally couple the ignition and the injection with one another strongly, because only in this way can an ignition of the fuel always be ensured. The proposed method achieves this in a particularly simple fashion.

Figure 4:
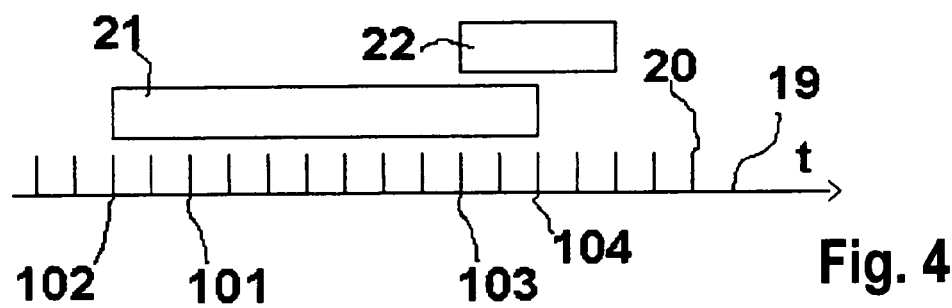
FIG. 4 shows a third time characteristic for the injection and the ignition.

A special case occurs at high rotational speeds of the internal combustion engine. Relative to the crankshaft angle, a very large angular range is required for the time necessary for the charging of the ignition coil. However, the parameters for the injection, in particular the injection quantity, are first available only at a point in time at which the charging of the ignition coil has already begun. This situation is shown in FIG. 4. A timeline 19 is again shown, with angular pulses 20 plotted thereon. In comparison to FIGS. 2 and 3, the time scale of line 19 is significantly spread out; i.e., the lengths of time blocks 21 and 22 are not true to the scale of the blocks as shown in FIGS. 2 and 3. At start angle 102, the charging of the ignition coil is begun. Here as well, again a time counter is set at whose expiration the ignition takes place, at time 104. However, the parameters for the injection are first known only at time 101. This also makes sense, because the determinations of these parameters should not take place unnecessarily early. In order now to achieve a good temporal coupling between time duration 21 and time duration 22, the same pulse time is used for the calculation of the beginning of time duration 22 as is used for the calculation of the beginning of time duration 21. In this way, a relatively good temporal coupling is still achieved between the two different processes injection and ignition. The calculation of the start angle of injection 103 can be carried out using two different procedures.

In a first procedure, at time 101, that is, at the earliest possible time at which the necessary parameters for the calculation of the injection are present, the pulse time that was used for the calculation of time duration 21 is used to set an additional timer that indicates the time interval between time 101 and start time 103. The dynamic change that occurs between these two times, i.e., changes in the pulse times, would thus have no significance. Alternatively, it is also possible, through observation of the angular pulses, to determine the start time 103 for the injection in a defined range before the start angle. In some individual cases, this procedure can be simpler. However, the first procedure has the advantage that dynamic differences between times 101 and 103 can no longer result in an additional displacement of the injection.

The late knowledge of the injection parameters at high rotational speeds in comparison to the parameters for the beginning of the ignition is also due to the fact that at high rotational speeds there takes place what is known as an ignition overlap. In this ignition overlap, in a multicylinder internal combustion engine the charging of the ignition coil for a particular cylinder has already begun even though the angularly synchronous calculation mark related to this cylinder is still in the future. In this case, the parameters for the ignition are calculated using the angularly synchronous calculation mark of the previous cylinder, whereas the calculation of the parameters for the injection always takes place at the calculation mark allocated to the cylinder. With the method according to the present invention, in particular the use of a uniform pulse time for both calculations, a good temporal matching of these two different processes is however achieved even in this operating state. This procedure is therefore very advantageous in particular for jet-guided internal combustion engines, because temporally mutually adjusted manner.

What is claimed is:

1. A method for controlling an internal combustion engine having a crankshaft, comprising:
   forming, from an angular pulse of a sensor, a pulse time that is a measure for a rotation of the crankshaft per time unit, a combustion being intended to take place at a predetermined target angle of the crankshaft through an ignition of a spark plug and an injection of a fuel;
   performing a charging of an ignition coil before the ignition and the injection, the ignition and the injection each requiring a predetermined time duration;
   starting each of the charging and the injection before the target angle at a respective start time; and
   calculating the start times as a function of a time duration of the charging and a time offset of the injection to the target angle, the calculating of the start times taking into account the pulse time, wherein the same pulse time is used for the calculation of the start times of the charging and of the injection.

2. The method as recited in claim 1, further comprising:
   determining the pulse time from the last two angular pulses before the start time of one of the charging of the ignition coil and the injection, depending on which start time takes place earlier.

3. The method as recited in claim 1, further comprising:
   determining the pulse time as an averaged time over a multiplicity of angular pulses before the start time of one of the charging of the ignition coil and the injection, depending on which start time takes place earlier.

4. The method as recited in claim 1, further comprising:
   providing, at a predetermined synchronization angle before the target angle, items of information necessary for calculating the start times;
   situating the start times of the charging and of the injection after the synchronization angle; and
   if the start time of the charging is situated before the start time of the injection:
   determining a time delay between the start time of the charging and the start time of the injection, and
   starting the injection when the time delay has elapsed since the start time of the charging; and if the start time of the charging is situated after the start angle of the injection:
determining a second time delay between the start time of the injection and the start time of the charging, and
starting the charging when the second time delay has elapsed since the start time of the injection.

5. The method as recited in claim 1, further comprising:
checking at each angular pulse whether the rotation of the crankshaft plus a predetermined deviation has approached one of the start time of the charging and the start time of the injection; and
if the rotation of the crankshaft plus the predetermined deviation has approached one of the start time of the charging and the start time of the injection, activating time counters that contain time durations for the charging, the injection, and a corresponding time delay.

6. The method as recited in claim 1, further comprising:
at a predetermined synchronization angle before the target angle, providing items of information necessary for calculating the start time of the injection;
situating the start time of the charging of the ignition coil before the synchronization angle; and
calculating the start time of the charging of the ignition coil and the start time of the injection on the basis of a pulse time that was calculated before the synchronization angle.

7. The method as recited in claim 6, further comprising:
after the synchronization angle, and at a subsequent angular pulse following immediately after the synchronization angle, using the pulse time and the target angle for the injection;
calculating a time offset until the start time of the injection;
activating a time counter during the time offset; and
starting the injection after an expiration of the time counter.

8. The method as recited in claim 6, further comprising:
after the synchronization angle, checking at each angular pulse whether the rotation of the crankshaft plus a predetermined deviation has approached the start time of the injection; and
if the rotation of the crankshaft plus the predetermined deviation has approached the start time of the injection, activating a time counter with a time duration for the injection.

* * * * *